United States Patent [19]

von Holdt

[11]  4,280,976
[45]  Jul. 28, 1981

[54] SIMULTANEOUSLY MOLDED THREADED PORT AND PLUG

[76] Inventor: John W. von Holdt, 7430 N. Croname Rd., Niles, Ill. 60648

[21] Appl. No.: 141,398

[22] Filed: Apr. 18, 1980

[51] Int. Cl.³ .............................................. B29D 1/00
[52] U.S. Cl. ..................................... 264/152; 29/416; 29/418; 249/59; 264/318; 264/334; 425/438; 425/DIG. 59
[58] Field of Search ...................... 29/416, 418, 240.5, 29/456; 249/58, 59; 425/438, DIG. 59; 264/152, 318, 334

[56] References Cited
U.S. PATENT DOCUMENTS
3,330,006  7/1967  Jenkins ................................ 249/59 X Primary Examiner—Thomas P. Pavelko
Attorney, Agent, or Firm—Charles F. Pigott, Jr.; Garrettson Ellis

[57] ABSTRACT

A simultaneously molded threaded port and plug may be produced by a mold which comprises a first cavity for receiving molding compound to form a wall, a second cavity for receiving molding compound to form the threaded plug, and rotatable shaft means carrying external thread forming grooves and extending through the first cavity to define the threaded port. The shaft means terminates at the second cavity, with an end portion of the shaft being shaped to form a separable mechanical linkage between the end portion and the plug molded in the second cavity means. The shaft is rotated after molding to withdraw it from the molded, threaded port, and to rotate the molded, threaded plug into the threaded port for sealing thereof.

19 Claims, 11 Drawing Figures

1

SIMULTANEOUSLY MOLDED THREADED PORT AND PLUG

BACKGROUND OF THE INVENTION

This application relates to a mold which is adapted to simultaneously mold a closure having a threaded port, plus a separate, threaded plug adapted for sealing the port. As the mold opens, the plug is screwed into the port so that the complete closure is provided in a single shot.

Threaded port closures are used for large cans, for example, five-gallon paint cans, and large containers of industrial chemicals and the like.

It is, of course, a major labor-saving improvement to mold the closure with its threaded plug seated in the port, avoiding the need for installation of the plug. However, added advantages are also provided by this invention. For example, since the plug and the closure are molded simultaneously out of the same molding compound, their rates of shrinkage can be expected to be identical, so there is no problem of fitting the plugs to the threaded ports, as may take place when a plug is molded in a separate operation. In that case, due to unequal shrinkage of the two parts on cooling because of the use of different lots of molding compound, or due to differing molding conditions, the plug may not fit the port.

The invention of this application may be adapted to injection molds and other mold types as may be desired, to provide the high speed molding of threaded port closures and their threaded plugs, installed therein in a single molding operation.

DESCRIPTION OF THE INVENTION

In accordance with this invention, a mold comprises first cavity means for receiving molding compound to form a wall which carries a threaded port. Second cavity means are provided for receiving molding compound to form the threaded plug. Rotatable shaft means, carrying a helical, external thread-forming groove, extends through the first cavity to define the threaded port upon molding.

The shaft means terminate at the second cavity means, with an end portion being shaped to form a separable mechanical linkage between the end portion and the threaded plug which is molded in the second cavity means.

Means for rotating the shaft are provided so that, after the molding step, when the parts have hardened, the shaft may be rotated to withdraw it from the molded, threaded port. Simultaneously, the separable mechanical linkage causes the newly-molded, threaded plug to be correspondingly rotated so that it is screwed into the threaded port for sealing thereof.

Preferably, gate means are provided between the first and second cavity means, permitting the flow of molding compound therebetween. The gates means is relatively narrow, so that the hardened molding compound in the gate means is severable as the plug is rotated into the threaded port by action of the shaft means.

Thereafter, when the mold is opened, the separable mechanical linkage between the shaft and the plug may be easily terminated, for expulsion of the molded closure from the mold cavities.

It is also preferred for a freely rotatable wall-forming member to define the side of the second cavity means which is opposed to the end portion of the shaft means.

The rotatable wall member defines projections to create in the plug gripper means or the like to facilitate removal of the molded plug from the threaded port, when that is desired. Specifically, any shape of projections may be utilized, for example, a pair of projections which form a tongue or wall member which can be turned by pliers for opening the plug. Alternatively, an annular projection may be used with the negative shape of a hexagonal nut in its center so that the outer surface of the plug defines a projecting hexagonal nut member for gripping by a wrench to remove the plug from the port.

The second cavity means also preferably defines a helical thread-forming groove in which the remotest portion of the thread-forming groove from the shaft means extends at least 360° about the second cavity means, and is of essentially equal depth to the corresponding helical thread-forming groove of the port-defining portion of the shaft means. The remainder of the thread-forming groove in the second cavity is then of slightly less depth, so that the remotest thread-forming groove portion defines in the plugs molded therein a final sealing portion when the plug is placed into the threaded port.

Also, it is preferable for the remotest thread-forming groove portion of the second cavity to be of a different pitch from the remaining thread-forming groove, to mold a thread which serves also as a retaining lock as well as a seal of the plug in the threaded port. The term "pitch" relates to the distance between the bottoms of adjacent coils of thread-forming groove, as well as the coils of helical thread of the molded parts. Preferably, the remotest thread-forming groove portion defines a larger pitch than the remaining thread-forming groove of the second cavity means and also the shaft means. Of course the same is true with respect to the threads of the molded parts.

It is also desirable for the first cavity means to be adapted to form a flexible wall about the threaded port which can be alternatively moved to occupy an inner, convoluted position for storage and an outwardly-extending position to serve as a pour spout.

The novel closure can be made in accordance with this invention in a single molding operation in which the plug is sealed and retained in the threaded port, particularly by the action of the remotest thread portion as described above. Also, the spout structure of this invention provides a useful improvement in the pourability of materials from the container utilizing the closure of this invention.

Figure 1:
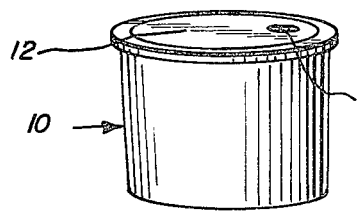
FIG. 1 is a perspective view of a container carrying the closure of this invention.

Referring to FIG. 1, a bucket 10 is shown having a lid 12 utilizing the closure plug 15 of this invention. The bucket may be integrally molded with the closure as a part of it, or, as shown in the subsequent drawings, a snap-on bucket lid may be applied utilizing the closure of this invention. Alternatively, lid 12 may be heat sealed or adhesively bonded to bucket 10 about its periphery. Such a bucket may be used as a five-gallon paint bucket, or as a container for chemicals, foods, and the like.

Figure 2:
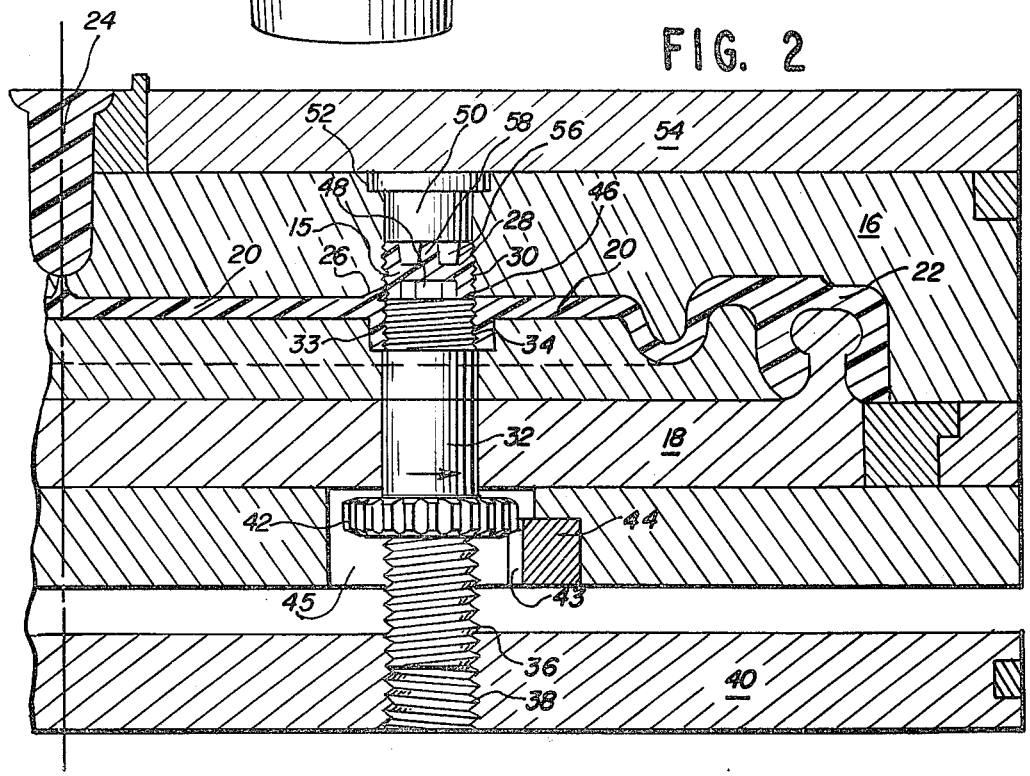
FIG. 2 is a longitudinal sectional view of an injection mold system utilizing the invention of this application for making the closure of FIG. 1, shown in an initial state of operation.

Referring to FIG. 2, an injection mold is provided, being made of an upper mold half 16 and a lower mold half 18, between which is defined first cavity means 20 for defining the closure lid 12 for bucket 10. Lid 12 defines a bucket rim grasping member 22 of annular shape which may be of any conventional design, and particularly may be of a design as disclosed in U.S. Application Ser. No. 101,220, filed by me on Dec. 7, 1979.

The main sprue 24 for the introduction of molding compound to first cavity 20 is shown. A subgate 26 is provided, with the gate being relatively narrow in transverse dimension, to permit molding compound to pass from first cavity 20 to a second cavity 28 which is adapted to form the threaded plug as shown therein.

Second cavity 28 defines a helical thread-forming groove 30 for defining the thread of the plug formed in cavity 28.

A rotatable shaft 32 is provided, carrying an external helical thread-forming groove 34, and extending through first cavity 20 to help define closure port 33 of lid 12, molded in cavity 20. Rotatable shaft 32 also carries helical thread 36 at its rear end which mates in rotatable relation with helical thread 38 of platen 40.

Shaft 32 also carries a gear 42 which is in operating relation with a rack 44 (or a rack chain) having teeth 43 which engage gear 42, so that shaft 32 can be rotated by motion of the rack, which may be appropriately and conventionally activated. Shaft 32 moves inwardly or outwardly of the first cavity 20 as it rotates.

Figure 3:
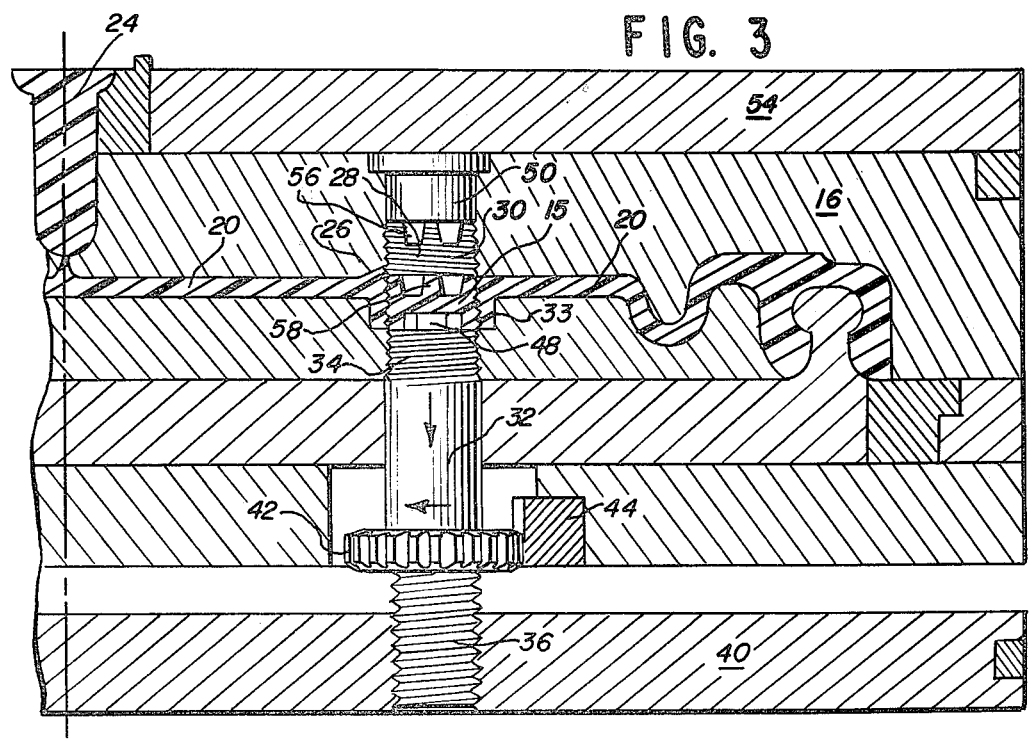
FIG. 3 is a longitudinal sectional view similar to FIG. 2, but showing the injection mold system in a later stage of operation.

Rack 44 as shown is wide enough to accommodate the longitudinal motion of shaft 32 as it rotates between the two positions shown in FIGS. 2 and 3, without losing interconnection with gear 42. Also space 45 is provided to permit the back-and-forth, longitudinal motion of gear 42 during rotation of shaft 32.

Shaft 32 terminates at its outer end at the second cavity 28 to define one wall 46 of the second cavity. Shaft 32 defines a projecting member 48, extending outwardly from wall 46 and projecting into second cavity 28. As specifically shown, projecting member 48 is shaped in the form of a hexagon in cross section, in the shape of a hexagonal head of a bolt or the like, so that the plug molded in second cavity 28 defines a cavity corresponding to the hexagonal projecting member 48. As the result of this, a separable mechanical linkage is formed between the end of shaft 32 and the plug molded in second cavity 28, so that the molded plug will rotate with shaft 32.

The side of second cavity 28 opposed to wall 46 is defined by a rotatable wall member 50 which, as shown in FIGS. 2 and 3, is a freely rotatable metal member secured in the seat 52 of mold half 16 by an overlaying platen 54. Wall forming member 50 defines projections 56 to create in the opposite side of plug 15 indentations which serve to define means to facilitate removal of the plug from the threaded port during use of the container.

Figure 7A:
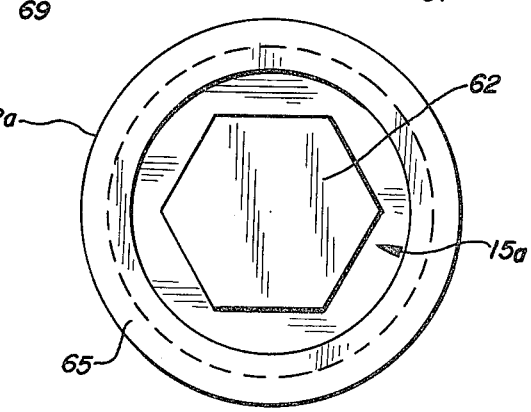

For example, as specifically shown in FIGS. 2 through 7, a tongue 58 may be defined by projecting members 56 of the rotatable wall forming member 50. This may be gripped with pliers or the like after molding and used to open the molded plug 15 or to close it, as may be desired. Alternatively, the projections 56 may be modified to be an annular structure defining in its interior a hexagonal projection 62 (FIG. 7A) formed on the upper surface of a molded plug 15a so that a socket wrench may be used to screw and unscrew the plug from its threaded port closure 12a.

It is preferred for the second cavity 28 to define a helical thread-forming groove portion 64 which is most remote from shaft 32, said thread extending at least 360° about the second cavity 28, to mold a thread portion 65 of plug 15 which is generally of essentially equal depth to the thread-forming groove 34 of the port-defining portion of shaft 32, with the remainder of the thread-forming grooves 30 in the second cavity 28 being of slightly less depth. Thus the remainder 67 of the thread of plug 15 is of less width than portion 65, as shown in FIG. 5, with a space 69 existing at the apexes of grooves formed between threads 71 of the closure port 33, formed in lid 12 in the first cavity 20.

The remotest thread-forming groove 64 is also preferably of a wider pitch than the other thread-forming grooves, its pitch or spacing from its adjacent grove being, for example, essentially 0.05 or 0.07 inch per 360° turn of groove 64, which the pitch or spacing between the remaining thread-forming groove 30 may be about 0.06 inch per turn. Accordingly, remotest thread-forming groove 64 molds a thread in plug 15 which serves as both a seal and a retaining lock of the plug in the threaded port. The irregular spacing of thread portion 64 causes binding and distortion of its material as it is threaded into port 33, causing the locking action.

Figure 5:
FIG. 5 is an enlarged longitudinal sectional view showing the relationship of the various threads in the closure of this invention.

As shown in greater detail in FIG. 5, plug 15 is shown in locked relation with the threaded port 33 of a molded closure 12. Remotest thread 65 of plug 15, which is formed by molding into thread-forming groove 64, is shown to be in intimate relation with the bottoms of the troughs between the threads 71 formed by molding against thread-forming grooves 34 of shaft 32. A differential in the pitch or spacing in the thread portion 65 can be seen, when compared with the remaining thread portion 67 of plug 15. Outermost thread portion 65 forms a seal about more than 360° of threaded plug 15, while at the same time the difference in pitch causes a locking action between plug 15 and its port, so that the plug is not easily removed after it has been screwed into the threaded port, due to the distortion of the thread portion 65 and like which is, of course, generally possible since the parts are made out of molded plastic. Thread 71 is preferably generally uniform in pitch, corresponding in pitch to thread portion 67.

FIG. 2 shows the configuration of the mold of this invention in its molding phase. Molding compound enters the system through main sprue 24, passing into first cavity 20 and filling it. The molding compound also passes from first cavity 20 through gate 26 into second cavity 28, with the threaded portions being formed in both cavities by the presence of thread-forming portions 30, 34.

After the molded parts in the respective cavities have hardened, rack member 44 is operated to rotate shaft 32 through gear 42. The molded plug 15 formed in cavity 28 rotates with shaft 32 by the mechanical linkage imparted by member 48, with wall forming portion 50 freely rotating with plug 28. The newly formed threads of plug 28 engage with the threads newly formed by the action of thread-forming members 34 in the threaded port, so that the rotating plug enters into threaded, sealing relationship within the threaded port 33 as shown in FIG. 3. This, of course, causes plug 15 to move downwardly with shaft 32, which moves downwardly due to the action of helical threads 36 and 38 at the bottom of shaft 32. Plug 15 disengages from freely rotatable wall member 50 as it moves downwardly.

Figure 4:
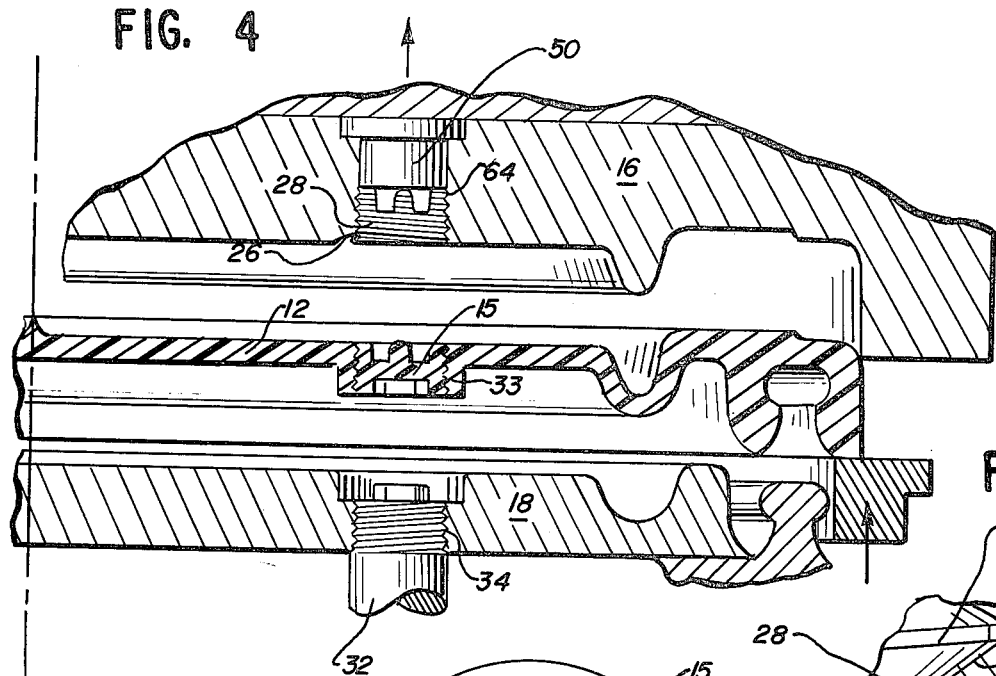
FIG. 4 is a fragmentary longitudinal sectional view showing the opening of the injection mold of FIGS. 2 and 3 to release the desired molded closure.
Figure 6:
FIG. 6 is a fragmentary, sectional view of some of the thread-forming groove of the second cavity means.
Figure 7:
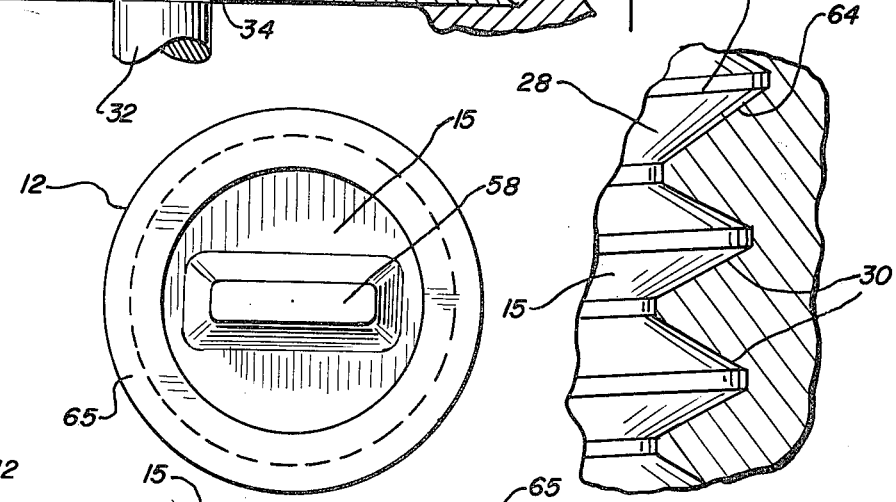
FIGS. 7 and 7A are top plan views of the plug of this invention, showing differing gripper members which may be molded therein.

Thereafter, as shown in FIG. 4, mold halves 16 and 18 are opened, and the resulting closure member 12, carrying plug 15, may be removed.

Thereafter, the mold halves 16, 18 are closed again. Rack 44 is moved to advance shaft 32 back into its original position as shown in FIG. 2.

Figure 8:
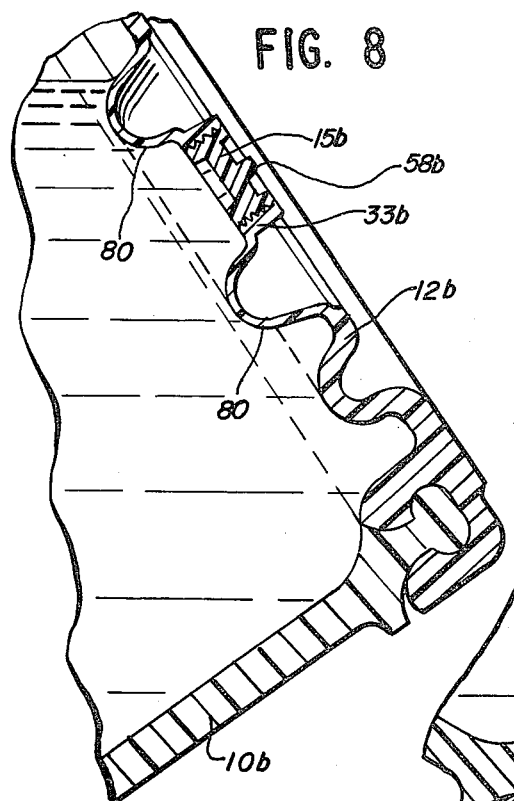
FIG. 8 is a sectional view of another embodiment of the closure of this invention as utilizing a flexible pour spout closure for a container.
Figure 9:
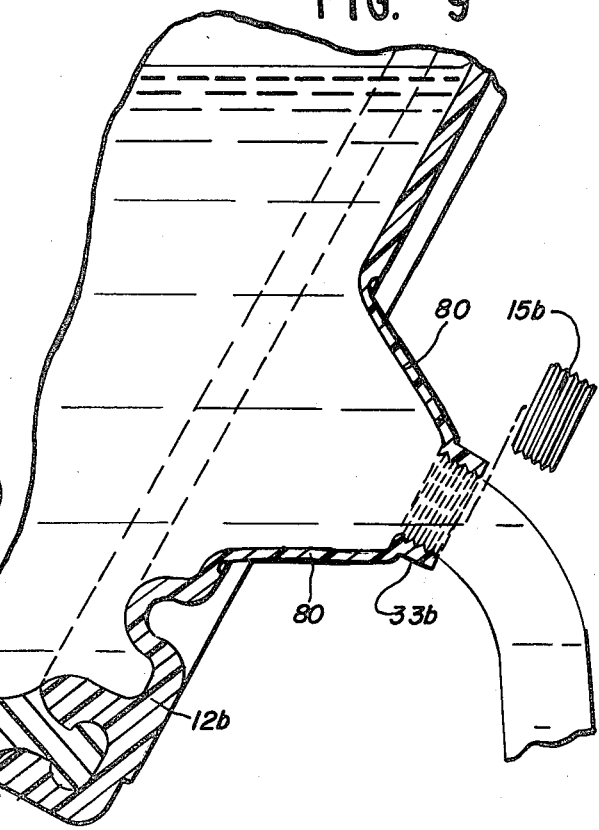
FIG. 9 is a sectional view similar to FIG. 8 but showing the pour spout closure in extended position.

Referring to FIGS. 8 and 9, an alternative design for the plug and closure of this invention is disclosed. Plug 15b is shown to occupy a threaded port 33b in a closure 12b on bucket 10b, being manufactured in the manner previously described. Tongue member 58b is also shown, being analogous to the previous tongue member 58.

In this embodiment, the first cavity means described above is adapted to form a flexible wall 80 by thinning about the threaded port 28b. Flexible wall 80 is shown to be movable between and to alternatively occupy an inner, convoluted position for storage as shown in FIG. 8, and an outwardly extending position to serve as a pour spout as shown in FIG. 9. Plug 15b may be removed, and the convoluted structure may be grasped by a pair of pliers, whereby simple pulling causes it to extend in the manner shown. The material may then be poured with greater ease out of the container.

Figure 10:
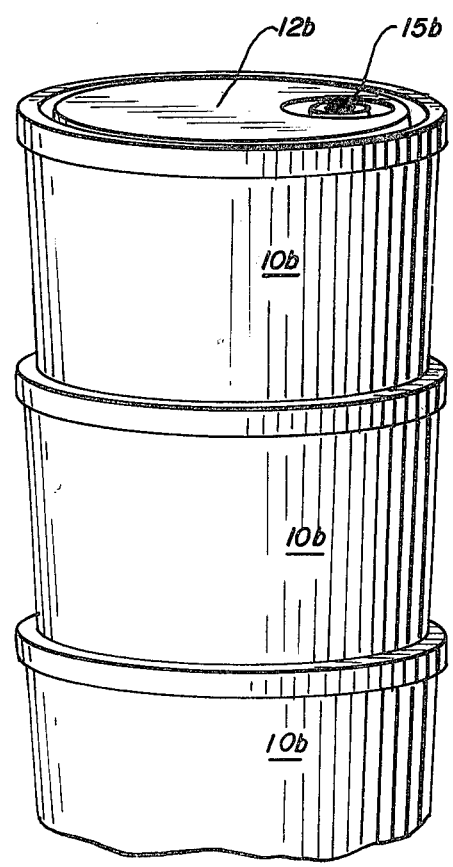
FIG. 10 is a perspective view showing stacked containers having the closure of FIG. 8.

After dispensing the desired amount of liquid, the entire structure may be pushed so that it resumes its inner convoluted position, and plug 15b may be reinstalled. Accordingly, containers utilizing this type of closure may be stacked as in FIG. 10, one on top of the other, in storage. After removal from storage, the closure may be moved into its outwardly extending position for use as a pour spout.

The above has been offered for illustrative purposes only, and is not intended to limit the scope of the invention of this application, which is as defined in the claims below.

That which is claimed is:

1. The method of simultaneously molding a threaded port in a wall and a separate, threaded plug adapted for sealing said threaded port, which comprises:
defining first cavity means for receiving molding compound to form said wall, and second cavity means for receiving molding compound to form said threaded plug; inserting rotatable shaft means carrying external threads through said first cavity to define the threaded port, said shaft means terminating at the second cavity means; placing molding compound into said first and second cavity means for molding the wall and plug; forming a separable mechanical linkage between said end portion and plug molded in the second cavity means; rotating said shaft after hardening of the molding compound to withdraw it from the newly molded, threaded port and to rotate the molded, threaded plug into said threaded port for sealing thereof.

2. The method of claim 1 including the step of passing molding compound from said first cavity means to the second cavity means to fill said second cavity means through relatively narrow gate means, and severing the molding compound in said gate means as the plug is rotated into the threaded port.

3. The method of claim 2 which comprises impressing into the side of said plug opposed to the shaft means a grippable member to facilitate removal of a plug from the threaded port.

4. The method of claim 3 which comprises molding said flexible wall about the threaded port to a sufficiently low thickness that said wall is flexible and capable of alternatively occupying an inner, convoluted position for storage, and an outwardly extending position to serve as a pour spout.

5. The method of claim 4 in which said plug is molded so that the thread thereof which is remotest from said shaft is molded about at least 360° with a different pitch and an enlarged outer diameter relative to the remaining thread of said plug, whereby said remotest thread serves as a seal and retaining lock of said plug in the threaded port.

6. In a mold adapted to simultaneously mold a threaded port in a wall and a separate, threaded plug adapted for sealing said threaded port,
first cavity means for receiving molding compound to form said wall; second cavity means for receiving molding compound to form said threaded plug; rotatable shaft means carrying a helical, external thread-forming groove and extending through said first cavity to define the threaded port, said shaft means terminating at said second cavity means with an end portion being shaped to form a separable, mechanical linkage between said end portion and a plug molded in the second cavity means, and means for rotating said shaft after molding to withdraw it from the molded, threaded port and to rotate the molded, threaded plug into said threaded port for sealing thereof, and a freely rotatable wall-forming member defining the side of said second cavity means which is opposed to said shaft means, said rotatable wall-forming member defining projections to create in the molded plug means to facilitate removal thereof from the threaded port.

7. In a mold adapted to simultaneously mold a threaded port in a wall and a separate, threaded plug adapted for sealing said threaded port,
first cavity means for receiving molding compound to form said wall; second cavity means for receiving molding compound to form said threaded plug; rotatable shaft means carrying a first helical, external thread-forming groove and extending through said first cavity means to define the threaded port, said shaft means terminating at said second cavity means with an end portion being shaped to form a separable mechanical linkage between said end portion and a plug molded in the second cavity means, and means for rotating said shaft means after molding to withdraw it from the molded, threaded port and to rotate the molded, threaded plug into the threaded port for sealing thereof, said second cavity means defining a second helical thread-forming groove, the portion of thread-forming groove of said second thread-forming groove which is remotest from said shaft means being of a different pitch from the remaining thread-forming groove portion, to mold a thread in said plug which serves as a retaining lock of said plug in the threaded port.

8. In a mold adapted to simultaneously mold a threaded port in a wall and a separate, threaded plug adapted for sealing said threaded port, first cavity means for receiving molding compound to form said wall;

second cavity means for receiving molding compound to form said threaded plug;

rotatable shaft means carrying a helical external thread-forming groove and extending through said first cavity to define the threaded port, said shaft means terminating at said second cavity means with an end portion being shaped to form a separable mechanical linkage between said end portion and a threaded plug molded in the second cavity means, and means for rotating said shaft after molding to withdraw it from the molded, threaded port and to rotate the molded, threaded plug into said threaded port for sealing thereof.

9. The mold of claim 8 in which gate means are provided between said first and second cavity means permitting flow of molding compound therebetween, the hardened molding compound in said gate means being severable as said plug is rotated into said threaded port.

10. The mold of claim 9 in which a freely rotatable wall-forming member defines the side of said second cavity means which is opposed to said shaft means, said rotatable wall member defining projection means to create in the plug member means to facilitate removal thereof from the threaded port.

11. The mold of claim 10 in which said first cavity means is adapted to form a flexible wall about said threaded port which can alternatively occupy an inner, convoluted position for storage, and an outwardly extending position to serve as a pour spout.

12. The mold of claim 10 adapted to form a container lid.

13. The mold of claim 10 in which said second cavity means defines a helical thread-forming groove, the remotest thread-forming groove portion from said shaft means extending at least 360° about said second cavity means and being of essentially equal depth to the thread-forming groove of the port-defining portion of the shaft means, the remainder of said thread-forming groove in said second cavity means being of slightly less depth.

14. The mold of claim 13 in which said remotest thread-forming groove portion is of a different pitch from the other thread-forming groove portions, to mold a thread which serves as a seal and retaining lock of said plug in the threaded port.

15. The mold of claim 14 in which said remotest thread-forming groove portion defines a larger pitch than the remaining thread-forming groove portions of said second cavity means and shaft means.

16. In a mold adapted to simultaneously mold a threaded port in a wall and a separate, threaded plug adapted for sealing said threaded port, first cavity means for receiving molding compound to form said wall; second cavity means for receiving molding compound to form said threaded plug; gate means between said first and second cavity means permitting flow of a molding compound therebetween; rotatable shaft means carrying a helical external thread-forming groove and extending through said first cavity to define the threaded port, said shaft means terminating at said second cavity means with an end portion being shaped to form a separable mechanical linkage between said end portion and a plug molded in the second cavity means, and means for rotating said shaft after molding to withdraw it from the molded, threaded port and to rotate the molded, threaded plug into said threaded port for sealing thereof, while severing hardened molding compound in said gate means upon said rotation; and a freely rotatable wall-forming member defining the side of said second cavity means which is opposed to said shaft means, said rotatable wall-forming member defining projections to create in the molded plug means to facilitate removal thereof from the threaded port, in which said second cavity means defines a helical thread-forming groove, the remotest thread-forming groove portion from said shaft means extending at least 360° about said second cavity means and being of essentially equal depth to the thread-forming groove of the port-defining portion of the shaft means, the remainder of said thread forming groove in said second cavity means being of slightly less depth.

17. The mold of claim 16 in which said remotest thread-forming groove portion is of a different pitch from the other thread-forming groove portions, to mold a thread which serves as a seal and retaining lock of said plug in the threaded port.

18. The mold of claim 17 in which said remotest thread-forming groove portion defines a larger pitch than the remaining thread-forming groove portions of said second cavity means and shaft means.

19. The mold of claim 16 in which said first cavity means is adapted to form a flexible wall about said threaded port which can alternatively occupy an inner, convoluted position for storage and an outwardly extending position to serve as a pour spout.

* * * * *